3,636,221
LOCAL ANESTHETICS COMPRISING α-PHENYL-
α-ALKYLSUCCINIMIDES
Rune Verner Sandberg, Jarna, Sweden, assignor to
Aktiebolaget Astra, Sodertalje, Sweden
No Drawing. Filed Nov. 8, 1968, Ser. No. 774,482
Claims priority, application Sweden, Nov. 29, 1967,
16,406/67
Int. Cl. A61k 27/00
U.S. Cl. 424—274                                    19 Claims

ABSTRACT OF THE DISCLOSURE

New α-phenyl-α-alkylsuccinimides substituted at the nitrogen atom with an alkylaminoalkyl group are disclosed which are effective as local anesthetics.

---

The present invention relates to N-alkyl aminoalkyl substituted α-phenyl-α-alkylsuccinimides and their salts and also to a process for their preparation as well as pharmaceutical preparations thereof.

More particularly the present invention relates to compounds of the formula

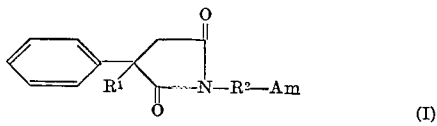

(I)

wherein $R^1$ is selected from the group consisting of saturated and unsaturated straight and branched lower alkyl with at most 6 carbon atoms; $R^2$ is a bivalent saturated straight or branched hydrocarbon radical including carbocyclic bivalent groups containing at most 6 carbon atoms and A$m$ is an amino group selected from the class consisting of

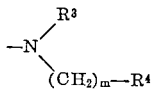

wherein $R^3$ is a hydrogen atom or a straight or branched lower alkyl group, $R^4$ is a hydrogen atom, a hydroxy or lower alkoxy group and $m$ is 1–4 in cases when $R^4$ is a hydrogen atom or 2, 3 or 4 in cases when $R^4$ is a hydroxy or lower alkoxy group, and a process for their preparation.

Illustrative examples of compounds of the present invention are the following:

N-[3-(N'-methyl-N'-hydroxyethylamino)-propyl]-
α-phenyl-α-propylsuccinimide,
N-[3-(N'-methyl-N'-hydroxyethylamino)-propyl]-
α-phenyl-α-pentylsuccinamide,
N-(3-ethylaminopropyl)-α-phenyl-α-n-propylsuccin-
amide,
N-(2-dimethylaminoethyl)-α-phenyl-α-n-propylsuccin-
imide,
N-[3-(N'-methyl-N'-ethoxyethylamino)-propyl]-
α-phenyl-α-propylsuccinamide,
N-[4-(N'-methyl-N'-hydroxyethylamino)butyl]-
α-phenyl-α-allylsuccinamide.

One object of the present invention is to provide new derivatives which are stable and possess valuable pharmacological properties. They are especially useful as local anaesthetics.

Another object of the present invention relates to the preparation of compositions suitable for manufacturing and which are to be administered to animals, including man.

For the preparation of the compounds according to the invention the following general reaction may be used,

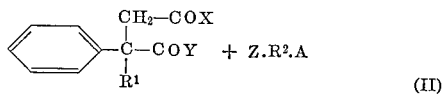

(II)

wherein $R^1$ and $R^2$ have the meaning described above and A is an amino group selected from the class consisting of

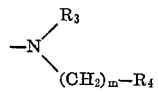

wherein $R^3$ is a hydrogen atom or a lower straight or branched alkyl group, $R^4$ is a hydrogen atom, a hydroxy or lower straight or branched alkoxy group and $m$ is 1–4 in cases when $R^4$ is a hydrogen atom, or 2, 3 or 4 in cases when $R^4$ is a hydroxy or lower alkoxy group, which amino group may be present at the reaction or introduced later in a manner known per se and where X, Y and Z are members of the group consisting of OH, Oalk, Hal, NH$_2$, —O—tosyl and which are capable of reacting in an arbitrary order with each other with the formation of a N-bridge, whereafter A$m$ in cases when A not is equal to A$m$, is transferred into A$m$ in a manner known per se. Thus, for instance, X and Y may first react with each other with the formation of an —O—bridge (an anhydride is formed) or a —NH-bridge (a cyclic imide is formed). This will be further illustrated by the examples given below.

The best method for the preparation of the compounds according to the invention consists in reacting preferably equivalent amount of a dicarboxylic acid or its anhydride with an alkylene diamine in accordance with the following general scheme:

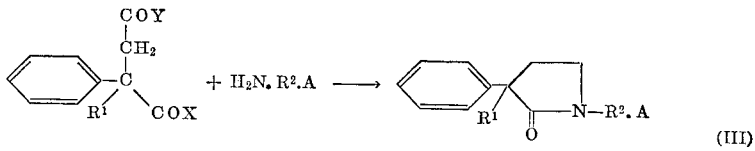

(III)

where $R^1$, $R^2$ and A have the meaning given above.

Other methods for the preparation of the compounds according to the invention may be represented by the following reaction schemes:

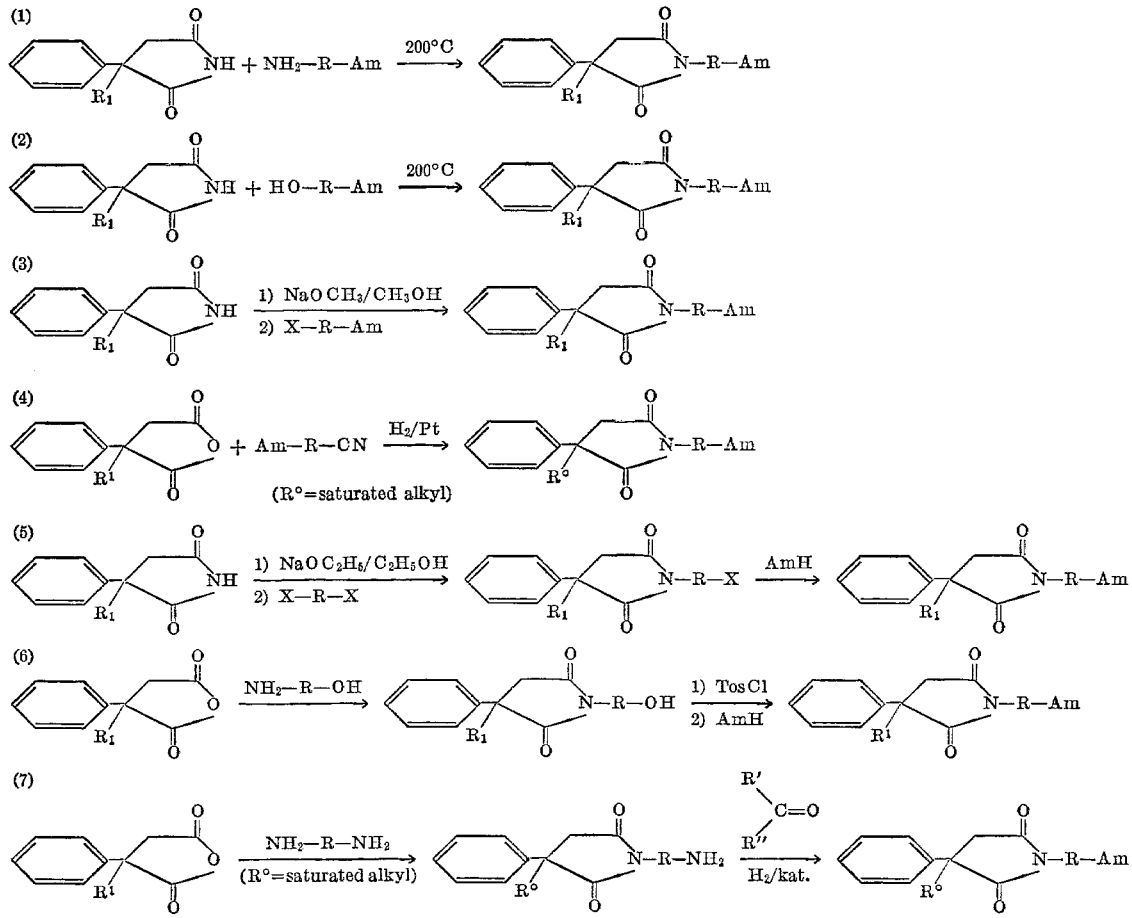

The choice between the different methods of preparation is affected by the structure of the compound to be prepared, i.e. whether a mono- or dialkylamino derivative is to be prepared.

The compounds according to the invention may occur in stereoisomeric forms or even in pairs of enantiomorphes. This is due to the presence of one or more asymmetric carbon atoms in the molecule. The present invention comprises the optically pure forms as well as mixtures of them.

It has now been found that the compounds according to the invention possess valuable pharmacological properties, especially they are active as local anaethetics. As such some of the compounds may be used for topical anaesthesia while others may favourably be used for infiltration anaesthesia with an often longlasting effect.

These advantages are obtained by the use of one or more compounds selected from the defined group consisting of alkylaminoalkyl derivatives of succinimides and pharmaceutically acceptable salts thereof. The expression "pharmaceutically acceptable salts" is recognized in the art to designate an acid addition salt which is physiologically innocuous when administered in a dosage and at an interval (i.e., frequence of administration) that is effective for the indicated therapeutic use of the parent compound.

Typical therapeutically acceptable addition salts of the derivatives of succinimides of the present invention include but are not limited to the salts of mineral acids, such as hydrochloric, hydrobromic, phosphoric or sulphuric acid, organic acids such as acetic, glycolic, lactic, levulinic, citric, fumaric, maleic, succinic, tartaric, benzoic and cinnamic acids and sulphonic acids, such as methanesulphonic and sulphamic acid.

In therapy the compounds according to the method are administered in the form of a solution in a pharmaceutical carrier. The concentration is not important and widely varying concentrations are therapeutically effective. Typically, solutions may contain from about 0.02% up to as high as about 10% by weight of the active substance. The compounds according to the invention may be administered in the form of other pharmaceutical preparations such as suspensions, jellies, ointments or bases. In these preparations the compounds may be used in the form of free bases or as addition salts or as both.

As is well known in the art, solutions of local anaesthetics may be made isotonic by the addition of i.a. sodium chloride. Furthermore it is known in the art of local anaesthesia, that the anaesthesia effectiveness may be improved by addition of a vasoconstrictor such as adrenaline, noradrenaline or octapressin.

The amount of local anaesthetic which may be used varies widely, as is well known, depending upon the location and type of anaesthesia required. The anaesthetic effect, according to the present invention, is induced by applying an amount of alkylaminoalkyl derivative of α-phenyl-α-alkyl-succinimide solution, which is effective to produce the desired anaesthesia. Repeated applications at therapeutically effective intervals may be made, if desired, to obtain a prolonged anaesthetic effect.

These compounds are most conveniently prepared by mixing equimolar amounts of the diacid or its anhydride with the appropriate amine and heating at 160–170° C. for 1–2 hours. The reaction mixture is distilled and the product obtained is either redistilled or converted to its hydrochloride. For a further understanding of this invention references may be given to the following examples:

EXAMPLE 1

N-(3-[N'-methyl-N'-hydroxyethylamino]-propyl)-α-phenyl-α-propylsuccinimide 4.36 g. (0.02 mole) of α-phenyl-α-propylsuccinic anhydride and 2.64 g. (0.02 mole) of 3-(N'-methyl-N'-hydroxyethylamino)-propylamine were mixed and heated on an oil bath at 165° C. for 1.5 hours. Two distillations afforded 4.14 g. of product, b.$_{0.03}$ 180° C. and having the formula

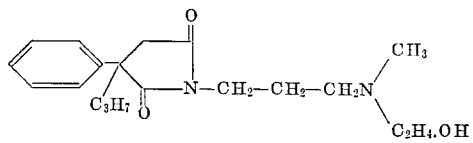

Compounds prepared in accordance with the method, described above are listed in the following Table I which also gives melting points and analytical data.

ing the succinic acid, the antipodes of which are then coupled with the appropriate amine. The latter method is illustrated for the preparation of the antipodes of one compound, falling within the scope of the present invention.

EXAMPLE 3

Resolution of α-phenyl-α-allylsuccinic acid 45.6 g. (0.195 mole) of α-phenyl-α-allylsuccinic acid and 83.9 g. (0.195 mole) of brucine (containing two moles of water of crystallization) were dissolved by heating in 550 ml. of 90% alcohol. The solution was allowed to reach room temperature and was then placed in a refrigerator over night. The salt obtained (63.2 g.) was recrystallized from the same solvent four times, whereupon the succinic acid had reached a constant rotation. The acid was isolated and recrystallized twice from ligroin-ethylacetate. The yield was 10.2 g., M.P. 138–140° C., $[\alpha]_D^{28} = -63.8°$ (95% alcohol).

The mother liquor from the first crystallization of the brucine salt was concentrated to ⅔ of the original volume. After one night in the refrigerator another crop of 19.3 g.

TABLE 1.—N-ALKYLAMINOALKYL-α-PHENYL-A-ALKYLSUCCINIMIDES OF THE FORMULA

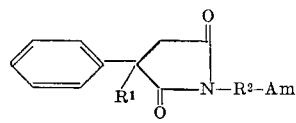

| Number | R¹ | —R²—Am | M.p. of hydrochloride or b.p./mm. Hg of free base | Analyses Calculated | | | Analyses Found | | |
|---|---|---|---|---|---|---|---|---|---|
| | | | | Percent N | Percent Cl | Mol. weight | Percent N | Percent Cl | Mol. weight |
| 1 | Allyl | —(CH₂)₃—N(CH₃)₂ | 133–5° C | 8.33 | 10.53 | | 8.28 | 10.6 | |
| 2 | do | —(CH₂)₃—N(C₂H₅)₂ | 125° C./0.005 | 8.53 | | | 8.45 | | |
| 3-A | do | —CH₂—CH₂—CH(CH₃)—N(C₂H₅)₂ | 143.5–5.5° C | 7.40 | 9.63 | | 7.40 | 9.64 | |
| 3-B | do | | 125° C./0.005 | 8.18 | | | 8.23 | | |
| 4 | do | —(CH₂)₃—N(CH₃)—CH₂—CH₂—OH | 140–5° C./0.04 | 8.48 | | 330.4 | 8.54 | | 331 |
| 5 | do | —(CH₂)₄—N(CH₃)(CH₂—CH₂—OH) | 180° C./0.03 | 8.14 | | 344.5 | 8.24 | | 342 |
| 6 | n-Propyl | —(CH₂)₃—N(CH₃)₂ | 175.5–7.5° C | 10.92 | | | 10.9 | | |
| 7 | do | —(CH₂)₃—N(C₂H₅)₂ | 103–5° C | 7.65 | 9.67 | | 7.6 | 9.5 | |
| 8 | do | —(CH₂)₄—N(C₂H₅)₂ | 125° C./0.005 | 8.13 | | | 8.12 | | |
| 9 | do | —CH₂—CH₂—CH(CH₃)—N(C₂H₅)₂ | 110° C./0.005 | 8.13 | | | 8.11 | | |
| 10 | do | —(CH₂)₂—N(CH₃)—CH₂—CH₂—OH | 175° C./0.02 | 8.79 | | 318.4 | 8.61 | | 317 |
| 11 | do | —(CH₂)₃—N(CH₃)—CH₂—CH₂—OH | 180° C./0.03 | 8.43 | | 332.5 | 8.55 | | 335 |
| 12 | do | —(CH₂)₄—N(CH₃)—CH₂CH₂—OH | 185° C./0.03 | 9.08 | | 346.5 | 8.22 | | 349 |

EXAMPLE 2

N-(2-dimethylaminoethyl)-α-phenyl-α-propylsuccinimide 2.4 g. of α-phenyl-α-propylsuccinimide and 1.0 g. of dimethylaminoethylamine were mixed and heated in an oil bath at 180° C. for 3 hours. Distillation afforded 2.6 g. of product, b.$_{0.1}$ 140° C. Conversion to hydrochloride yielded after recrystallization from butanone-acetonitrile 1.6 g. with M.P. 175–177.5° C. Mixed M.P. with compound No. 8 Table 1 gave no depression.

The enantiomers of the racemic imides can be separated in two ways, either by direct resolution by means of an optically active acid such as tartaric acid, dibenzoyltartaric acid, camphorsulphonic acid etc., or by first resolvsalt had crystallized. The acid from this salt had a specific rotation $[\alpha]_D = +51°$. From the mother liquor the remaining acid was isolated and recrystallized from ligroin-ethyl acetate until constant rotation was obtained, in all four times. Yield 6.3 g., M.P. 137.5–40° C., $[\alpha]_D^{28} = +64.1°$ (95% alcohol)

(+) and (−)-α-phenyl-α-propylsuccinic acid

These were obtained from the enantiomers of α-phenyl-α-allylsuccinic acid by hydrogenation at room temperature and atmospheric pressure over 10% Pd/C in 90% alcohol. The direction of rotation is not altered by the hydrogenation. The antipodes had M.P. 149–52.5° C. [from ligroin-ethyl acetate and $[\alpha]_D^{24} = +$ resp. $−1.5°$ (95% alcohol)].

From the optically active acids the corresponding N-amino-alkylsubstituted imides were obtained in the manner already described.

Some of the enantiomers prepared are described in the following Table 2.

lated in Table 3, which also shows the intravenous toxicity of the substances. The methods used for the determination of the anesthetic properties are methods well known in the art and they are in detail described in the publications referred to in the footnotes. The anesthetic potency

TABLE 2.—ENANTIOMERS OF N-AMINOALKYL-α-PHENYL-α-ALKYLSUCCINIMIDES OF THE FORMULA

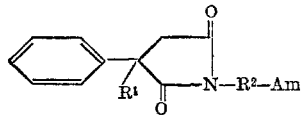

| | | | | | Analyses | | | |
|---|---|---|---|---|---|---|---|---|
| | | | | | Calc. | | Found | |
| Number | R¹ | —R²—Am | M.p. of hydrochloride or b.p. of free base | $[\alpha]_D^{25}$ (95% alcohol) | Mol. weight | Percent Cl | Mol. weight | Percent Cl |
| 13-I | }Allyl | (CH₂)₃—N(C₂H₅)₂ | 145–150°/0.005 mm. Hg | −17° | 328.4 | | 323 | |
| 13-II | | | 145–150°/0.005 mm. Hg | +17° | 328.4 | | 325 | |
| 14-I | }Propyl | (CH₂)₂—N(CH₃)₂ | 126–8° | −4.0° | | 10.92 | | 11.0 |
| 14-II | | | 126–8° | +4.3° | | 10.92 | | 11.0 |
| 15-I | }Propyl | (CH₂)₃—N(CH₃)(CH₂-CH₂-OH) | 175–80°/0.01 mm. Hg | −16° | 332.5 | | 332 | |
| 15-II | | | 175–80°/0.01 mm. Hg | +18° | 332.5 | | 332 | |

The succinic acids used for the preparation of succinimides were synthesized by means of known methods as is further illustrated in the following example.

EXAMPLE 4

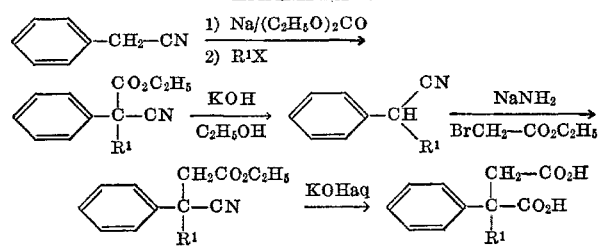

The corresponding anhydrides were easily obtained from the acids by refluxing in tetrachloroethane under a water separator.

α-Phenyl - α - allylsuccinic acid, M.P. 133–3.5° C. $C_{13}H_{14}O_4$, mol. weight calc. 234.3; found 232. Anhydride B.P.$_{0.2}$ 116–7° C.

$C_{13}H_{12}O_3$ calc. (percent): C, 72.21; H, 5.59; O, 22.20. Found (percent): C, 71.9; H, 5.58; O, 22.4.

α-Phenyl - α - propylsuccinic acid, M.P. 146.5–9° C. $C_{13}H_{16}O_4$, mol. weight calc. 236.3; found 233. Anhydride B.P.$_{0.5}$ 128–30° C.

$C_{13}H_{14}O_3$ calc. (percent): C, 71.54; H, 6.47; O, 21.99. Found (percent): C, 71.6; H, 6.75; O, 21.9.

The preparation of succinimides which may be used as starting materials for reactions 1, 2, 3 and 5 related in column 3 is illustrated in the following example.

EXAMPLE 5

α-Phenyl-α-propylsuccinimide 5.3 g. of α-phenyl - α - propylsuccinic anhydride were dissolved in 10 ml. of conc. aq. ammonia. The mixture was slowly heated up to 200° C. to distill off the water and then kept at this temperature for 2 hours. The resulting reaction mixture was directly distilled to yield 3.9 g. of product B.$_{0.1}$ 140–145° C. The IR-spectrum showed peaks characteristic of imide absorption at 1700 and 1760 cm.⁻¹ (C=O) and at 3400 cm.⁻¹ (N—H).

The compounds described in the above examples and Tables 1 and 2 have also been tested as to their anesthetic properties. The results from these tests have been tabuas measured on isolated fog sciatic nerve and rabbit cornea are based on Lidocaine as standard.

TABLE 3

| Compound number | Isolated frog sciatic nerve [1] (Lidocaine=1.0) | Rabbit cornea [2] (Lidocaine=1.0) | Toxicity, i.v., LD₅₀ mg./kg., white mouse |
|---|---|---|---|
| 1 | 0.3 | 0.5 | 34 |
| 2 | 0.7 | 1.5 | 25 |
| 3-A | 0.8 | 4 | 14 |
| 3-B | 0.8 | 1.5 | 17 |
| 4 | 0 | 0.6 | 42 |
| 5 | 0.3 | 1 | 40 |
| 6 | 0.7 | 0.5 | 51 |
| 7 | 0.4 | 4 | 17 |
| 8 | 0.4 | 1.5 | 16 |
| 9 | 0.9 | 3 | 18 |
| 10 | 0.2 | 0.5 | 92 |
| 11 | 0.7 | 1 | 33 |
| 12 | 0.1 | 1.3 | 33 |
| 13-I | 0.8 | 1.5 | 18 |
| 13-II | 0.5 | 1 | 23 |
| 14-I | 0.7 | 0.5 | 38 |
| 14-II | 0.4 | 0.4 | 48 |
| 15-I | 0.9 | 1 | 27 |
| 15-II | 0.5 | 1 | 49 |
| Lidocaine | 1.0 | 1.0 | 25 |

[1] Mauro, A., Truant, A. P. and McCawley, E. L., Yale J. Biol. Med. 21 (1948) 113.
[2] Wiedling, S., Acta Pharmacol. et toxicol. 8 (1952) 117.

EXAMPLE 6

Injectable solution containing N - (3 - [N' - methyl - N'- hydroxyethylamino]-propyl) - α - phenyl-α-propylsuccinimide.

To 100 ml. of hot, sterilized water 0.1 g. of methyl p-hydroxybenzoate was added while stirring and heating. When all benzoate were dissolved 2 g. of N - (3 - [N'- methyl - N' - hydroxyethylamino] - propyl) - α - phenyl- α-propylsuccinimide hydrochloride and 0.6 g. of sodium chloride were added while stirring. pH was adjusted to 7 by adding sodium hydroxide and sterilized water was added to 100 ml.

EXAMPLE 7

Injectable solution containing N-(3-diethylaminopropyl)-α-phenyl-α-allyl succinimide.

To 100 ml. of hot, sterilized water 0.1 g. of methyl p-hydroxybenzoate, 2 g. of N - (3 - diethylaminopropyl)- α - phenyl - α - allyl succinimide hydrochloride and 0.6 g. of sodium chloride were added in the same way as described in Example 6, but the solution was protected from air-oxygen by working in nitrogen atmosphere. 0.05 g. of sodium pyrosulphite was then dissolved, whereafter 1 mg. of adrenaline was added. pH was adjusted to 4 by adding sodium hydroxide and sterilized water was added to 100 ml.

EXAMPLE 8

Pharmaceutical jelly containing N-(4-diethylaminobutyl)-α-phenyl-α-n-propyl succinimide.

To 80 ml. of distilled water 0.5 g. of N-(4-diethylaminobutyl) - α - phenyl - α - n - propylsuccinimide hydrochloride was added. To this solution 4 g. of methylcellulose was added while stirring and when all methylcellulose was dissolved a solution of 50 mg. of chlorohexidine diglyconate in 10 ml. of water was added and the volume was adjusted to 100 ml. by addition of distilled water.

EXAMPLE 9

Pharmaceutical ointment containing N-(2-diethylaminoethyl)-α-phenyl-α-n-propyl succinimide.

Equal amounts (27 g. of each) of polyethyleneglycol 300 and polyethyleneglycol 1540 were melted together with 19 g. of polyethyleneglycol 3000 at 60° C. Then 25 g. of propyleneglycol and finally 2 g. of N-(2-diethylaminoethyl)-α-phenyl-α-n-propyl succinimide were added and the ointment was homogenized.

It will be understood that the foregoing examples are for exemplary purpose only, and that the present invention includes many modifications not specifically illustrated. Accordingly the scope of this invention is not to be limited, except as in consistent with the following claims.

In the specification and the claims the expression "lower alkyl and lower alkoxy groups" refer to groups containing not more than four carbon atoms.

What is claimed is:

1. A pharmaceutical preparation for inducing local anesthesia containing as an active ingredient an amount effective to induce anesthesia of a compound of the formula

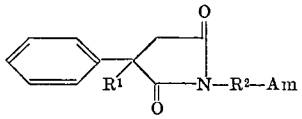

or therapeutically acceptable salts thereof, wherein $R^1$ is selected from the group consisting of saturated and unsaturated straight and branched chain lower alkyl groups having 3 carbon atoms, $R^2$ is selected from the group consisting of divalent saturated and unsaturated straight and branched chain hydrocarbon radicals containing 2 to 4 carbon atoms, and Am is an amino group of the formula:

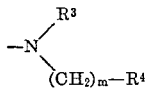

wherein $R^3$ is selected from the group consisting of hydrogen, methyl and ethyl, and $R^4$ is selected from the group consisting of hydrogen and hydroxy, and $m$ is 1 to 4 when $R^4$ is hydrogen and 2 to 4 when $R^4$ is hydroxy, said compound being in association with a pharmaceutically acceptable carrier.

2. The pharmaceutical preparation according to claim 1 wherein said compound is dissolved in sterile, injectible liquid.

3. The pharmaceutical preparation according to claim 1 containing between about 0.02 percent and 10 percent by weight of said compound.

4. The pharmaceutical preparation according to claim 1 containing in addition a vasoconstrictor in an amount effective to increase the anesthetic effectiveness of said compound.

5. A method for inducing local anesthesia, comprising administering to a host to be anesthetized an effective amount of at least one compound of the formula

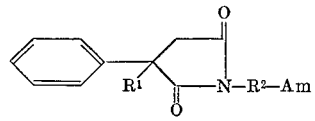

or therapeutically acceptable addition salts thereof, wherein $R^1$ is selected from the group consisting of saturated and unsaturated, straight and branched alkyl groups containing 3 carbon atoms, $R^2$ is selected from the group consisting of divalent saturated and unsaturated straight and branched chain hydrocarbon radicals containing 2 to 4 carbon atoms, and Am is an amino group having the formula

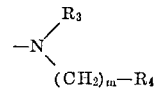

wherein $R^3$ is selected from the group consisting of hydrogen, methyl and ethyl, and $R^4$ is selected from the group consisting of hydrogen and hydroxy, and in which $m$ is 1 to 4 where $R^4$ is hydrogen and 2 to 4 when $R^4$ is hydroxy.

6. A method according to claim 5 wherein said compound is administered by infiltration.

7. A method according to claim 5 wherein said compound is administered by topical application.

8. A method according to claim 5 wherein said compound is N-(2-dimethylamino ethyl)-α-phenyl-α-n-propyl succinimide or its therapeutically acceptable acid addition salts.

9. A method according to claim 5 wherein said compound is N - [N' - methyl - N' - hydroxyethylamino]-propyl)-α-phenyl-α-n-propyl succinimide or its therapeutically acceptable acid addition salts.

10. A method according to claim 5 wherein said compound is N - (3 - [N' - methyl-N'-hydroxyethylamino]-propyl)-α-phenyl-α-allylsuccinimide or its therapeutically acid salts.

11. A method according to claim 5 wherein said compound is N-(4-[N'-methyl-N'-hydroxyethylamino]-butyl)-α-phenyl-α-allylsuccinimide or its therapeutically acceptable acid addition salts.

12. A method according to claim 5 wherein said compound is N - (3 - diethylaminopropyl) - α - phenyl-α-n-propylsuccinimide or its therapeutically acceptable acid addition salts.

13. A method according to claim 5 wherein said compound is N - (3 - diethylaminobutyl) - α-phenyl-α-allyl-succinimide or its therapeutically acceptable acid addition salts.

14. A method according to claim 5 wherein said compound is N - (3 - dimethylaminopropyl)-α-phenyl-α-allyl-succinimide or its therapeutically acceptable acid addition salts.

15. A method according to claim 5 wherein said compound is N - (3 - diethylaminopropyl)-α-phenyl-α-allyl-succinimide or its therapeutically acceptable acid addition salts.

16. A method according to claim 5 wherein said compound is N-(3-diethylaminobutyl)-α-phenyl-α-n-propyl-succinimide or its therapeutically acceptable acid addition salts.

17. A method according to claim 5 wherein said compound is N - (2 - methyl hydroxyethylamino ethyl)-α- phenyl-α-n-propylsuccinimide or its therapeutically acceptable acid addition salts.

18. A method according to claim 5 wherein said compound is N - (4 - diethylaminobutyl)-α-phenyl-α-propylsuccinimide or its therapeutically acceptable acid addition salts.

19. A method according to claim 5 wherein said compound is N - (4 - [N' - methyl-N'-hydroxyethylamino]-butyl) - α - phenyl - α - n-propyl succinimide or its therapeutically acceptable acid addition salts.

References Cited

UNITED STATES PATENTS

| 3,317,390 | 5/1967 | Hofmann et al. | 424—274 |
|---|---|---|---|
| 3,365,450 | 1/1968 | Lunsford et al. | 424—274 |
| 3,401,176 | 9/1968 | Hofmann et al. | 260—326.5 |
| 3,465,002 | 9/1969 | Bolhofer et al. | 260—326.3 |

ALBERT T. MEYERS, Primary Examiner

D. M. STEPHENS, Assistant Examiner

UNITED STATES PATENT OFFICE
CERTIFICATE OF CORRECTION

Patent No. 3,636,221    Dated January 18, 1972

Inventor(s) Rune Verner Sandberg

It is certified that error appears in the above-identified patent and that said Letters Patent are hereby corrected as shown below:

Col. 1, line 36 and Col. 2, lines 42 & 43, "A$m$" (each occurrence) should be --Am--.

Col. 2, Diagram III (bottom) the carbonyl group ($\overset{O}{\underset{}{\|}}$) is missing from the right-hand ring of the formula:

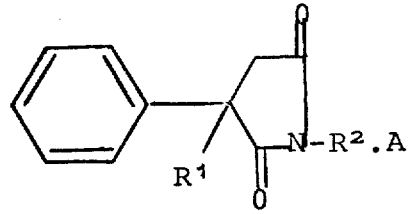

(III)

Col. 3, line 5, "Am=NH$_2$" should be --Am≠NH$_2$--.
Col. 3, line 58, "anaethetics" should be --anaesthetics--.
Col. 6, Table 1, last line under heading "Percent N" reads "9.08" should be --8.09--.
Col. 5, Table 1, Title, "A" should be --α--.
Col. 7, line 71, "B$_{0.1}$" should be --b$_{0.1}$--.
Col. 9, line 55, "of the formula" should be --having the formula--.
Col. 10, line 21, "having the formula" should be --of the formula--.
Col. 10, line 44, "N-[N'-methyl-N'hydroxyethylamino]-propyl)-α-phenyl-α-n-propyl" should be --N-(3-[N'-methyl-N' hydroxy ethyl amino]-propyl)-α-phenyl-α-n-propyl--.

Signed and sealed this 26th day of September 1972.

(SEAL)
Attest:

EDWARD M. FLETCHER, JR.
Attesting Officer

ROBERT GOTTSCHALK
Commissioner of Patents